US008828240B1

(12) United States Patent
Schranze et al.

(10) Patent No.: US 8,828,240 B1
(45) Date of Patent: Sep. 9, 2014

(54) RESIDENTIAL WASTEWATER PURIFICATION SYSTEM

(71) Applicants: Benjamin A. Schranze, Wynnewood, PA (US); Ronald Knepper, Belmont Hills, PA (US)

(72) Inventors: Benjamin A. Schranze, Wynnewood, PA (US); Ronald Knepper, Belmont Hills, PA (US)

( * ) Notice: Subject to any disclaimer, the term of this patent is extended or adjusted under 35 U.S.C. 154(b) by 0 days.

(21) Appl. No.: 13/682,251

(22) Filed: Nov. 20, 2012

(51) Int. Cl.
| C02F 1/465 | (2006.01) |
| C02F 1/32 | (2006.01) |
| C02F 1/44 | (2006.01) |
| C02F 1/463 | (2006.01) |
| B01D 61/02 | (2006.01) |
| C02F 3/00 | (2006.01) |

(52) U.S. Cl.
CPC ..................................... C02F 3/005 (2013.01)
USPC ................. 210/703; 210/748.01; 210/748.17; 210/532.2; 210/806

(58) Field of Classification Search
CPC ...... B01D 61/025; B01D 17/06; B01D 21/08; B01D 2311/06; B01D 2311/2684; C02F 1/463; C02F 9/00; C02F 1/441; C02F 1/32; C02F 1/465; B03D 1/1437
USPC .......... 210/631, 748.01, 748.17, 703, 748.18, 210/779, 791, 806, 86, 257.1, 25, 7.2, 259, 210/260, 532.2
See application file for complete search history.

(56) References Cited

U.S. PATENT DOCUMENTS

| 3,933,606 | A | 1/1976 | Harms |
| 4,012,319 | A | 3/1977 | Ramirez |
| 4,021,347 | A | 5/1977 | Teller et al. |
| 4,048,038 | A | 9/1977 | Kunkle |
| 4,101,409 | A | 7/1978 | Austin |
| 4,834,879 | A | 5/1989 | Stegall et al. |
| 5,108,563 | A | 4/1992 | Cook |
| 5,207,896 | A | 5/1993 | Graves |
| 5,421,972 | A | 6/1995 | Hickey et al. |
| 5,531,865 | A | 7/1996 | Cole |
| 5,626,745 | A | 5/1997 | Hawkinson |
| 5,741,426 | A | 4/1998 | McCabe et al. |
| 5,928,493 | A | 7/1999 | Morkovsky et al. |
| 6,139,710 | A | 10/2000 | Powell |
| 6,179,991 | B1 | 1/2001 | Norris et al. |
| 6,214,182 | B1 | 4/2001 | Ritter |
| 6,416,514 | B1 | 7/2002 | Ein-Gal |
| 6,416,667 | B1 | 7/2002 | Graves |
| 6,488,835 | B1 | 12/2002 | Powell |
| 6,517,711 | B1 | 2/2003 | Rummler et al. |
| 6,663,766 | B1 | 12/2003 | Adin et al. |
| 6,800,206 | B2 | 10/2004 | Robinson |
| 6,872,313 | B1 | 3/2005 | Samad et al. |
| 6,942,800 | B2 | 9/2005 | Jungbauer |
| 6,982,037 | B2 | 1/2006 | Horng et al. |
| 7,204,930 | B2 | 4/2007 | Nightingale |
| 7,344,641 | B2 | 3/2008 | Gresko |
| 7,413,650 | B2 * | 8/2008 | Lumbert ........................ 210/153 |
| 7,476,321 | B2 | 1/2009 | Hedegaard |
| 7,507,342 | B2 | 3/2009 | Smith |
| 7,517,454 | B2 | 4/2009 | Hu et al. |
| 7,550,076 | B2 | 6/2009 | Jordan et al. |
| 7,601,960 | B2 | 10/2009 | Albrecht et al. |
| 2008/0164206 | A1 * | 7/2008 | Dueker ......................... 210/636 |
| 2009/0107915 | A1 * | 4/2009 | Skinner et al. ................ 210/636 |
| 2010/0051542 | A1 * | 3/2010 | Elektorowicz et al. ....... 210/631 |
| 2011/0315561 | A1 * | 12/2011 | Rabaey et al. ................ 205/615 |

FOREIGN PATENT DOCUMENTS

| EP | 0794157 | 9/1997 |
| EP | 1053976 | 11/2000 |
| EP | 1496018 | 1/2005 |
| WO | WO 97/35808 | 10/1997 |

OTHER PUBLICATIONS

Patric et al, "Understanding DC Circuits", 2000, Butterworth-Heinemann, p. 96.*
Chen, G., "Electrochemical Technologies in Wastewater Treatment", Separation and Purification Technology, Vol . 38, 2004, pp. 11-41.
Mickley,M., "Pretreatment Capabilities and Benefits of Electrocoagulation", prepared by Mickley & Associates for the Office of Naval Research, Dec. 2004, pp. 1-67.
Nielson, K., et al., "Ozone-Enhanced Electroflocculation in Municipal Wastewater Treatment", J. Environ. Eng. Sci., vol. 4, 2005, pp. 65-76.
NSF International, "Removal of Arsenic in Drinking Water", ARS USA, LLC, ARS CFU-50 APC Electroflocculation and Filtration Water Treatment System, Environmental Technology Verification Report EPA/600/R-06-099, Sep. 2006, pp. 1-69.
NSF International, "Reduction of Nitrogen in Domestic Wastewater from Individual Residential Homes, RetroFAST 0.375 System, Environmental Technology Verification Report 03/08 QPC-SWP", Sep. 2003.
United States Environmental Protection Agency, "Ultraviolet Disinfection Guidance Manual for the Final Ling Term 2 Enhanced Surface Water Treatment Rule", Report EPA 815-R-06-007, Nov. 2006, pp. 1-436.

* cited by examiner

*Primary Examiner* — Nam Nguyen
*Assistant Examiner* — Claire Norris
(74) *Attorney, Agent, or Firm* — Caesar, Rivise, Bernstein, Cohen & Pokotilow, Ltd.

(57) ABSTRACT

A method to purify water includes the steps of providing a septic tank to hold unpurified water and having an outlet to provide a water stream for processing, and processing the water in an electrocoagulation and flocculation reactor that uses electrical energy to convert dissolved solid material in the water stream into suspended particulate form that can be subsequently filtered and separated out. The method continues with introducing air into the water stream to promote aerobic processing of contaminants and to assist in agglomeration and flocculation of suspended solid material, filtering the water stream to separate suspended solid material from the stream and to adsorb some of its dissolved contaminants, and processing the water stream with a reverse osmosis processor that provides a reject stream that provides water back to the septic tank and a recycle stream that provides unpurified water back to the water stream exiting the septic tank.

5 Claims, 3 Drawing Sheets

RESIDENTIAL WASTEWATER PURIFICATION SYSTEM

BACKGROUND OF THE INVENTION

This invention relates generally to the processing and purification of water and wastewater streams.

A significant fraction of housing units in the United States use onsite treatment of septic water incorporating as its basic treatment element the use of land processing and disposal. While such systems have included a variety of configurations and filtering media, almost all that have been sanctioned by state regulatory authorities involve the use of a septic tank and a soil filtering and absorption system in the form of a drainage field. Alternative use of sewer systems has been expensive and burdensome for many suburban and rural communities. Nevertheless, the need for and the construction of individual on-lot septic and wastewater treatment systems have been growing at a significant rate. Unfortunately, only about one-third of the available land area for such construction and use in the United States has soils that are suitable for onsite treatment systems. Moreover, in areas where there has been pressure for more housing, onsite systems have often been installed on land that is not suitable for conventional soil absorption systems. Contaminated wells attributed to inadequately treated septic tank effluent and nutrient enrichment of lakes from near-shore development are examples of what may occur when a soil absorption system is installed in an area with unsuitable soil or geological conditions. Also, because of the potential health hazards of improperly functioning systems, public health officials have sought methods that improve the performance of both new and existing onsite systems.

It would be beneficial to provide a system to treat septic waste from residences located in areas having institutional and environmental restrictions that do not allow or that limit the use of drainage fields and where there are no existing sewer facilities. Additionally, it would be beneficial to provide a system that produces an effluent stream having a purity level superior to that provided by the action of a conventional combination of septic tank systems that use properly configured drainage fields for final disposal.

The total amount of pollutant in residential septic discharges is usually less than 0.2% of the liquid stream, suggesting that there may be treatment methods that can concentrate or remove the relatively small amount of pollutant and leave the remaining water in a condition suitable for direct discharge into ground or surface waters, or even for reuse. Different techniques are available, including use of a variety of filters, chemical dosing, reverse osmosis, and evaporation. Some of these are either very pollutant specific or more expensive than employing the conventional use of septic tanks and drainage fields for use in areas having suitable soil characteristics. Some produce residual liquid streams containing concentrated quantities of contaminants that still require separate and additional treatment for subsequent and acceptable disposal.

Several septic treatment methods (such as those described in U.S. Pat. Nos. 6,872,313 and 6,942,800) discuss the introduction of air and even enzyme addition into septic tanks or reaction containers in order to cause or assist in aeration as a means to more completely process contaminants or even to eliminate the use of drainage fields. U.S. Pat. Nos. 6,982,037 and 7,517,454 describe the use of filtering and clarification to remove suspended particulate matter. Other methods, such as developed in U.S. Pat. No. 6,517,711 further extend the practical application of filtration by incorporating backwash capability presumably in order to reduce maintenance and filter replacement requirements. However, these may not always provide satisfactory purification results by themselves, particularly due to their failure in eliminating or even minimizing the content of dissolved solids and related ionic salts in their product water (effluent streams).

The use of evaporation or reverse osmosis treatment as employed for industrial wastewater processing or in desalination, has disadvantages when considered for residential application or for use in remote areas. Each produces a residual stream that must be disposed of in an alternative and often costly manner. Evaporation has been proven too complex for small systems and would require relatively large energy levels for its operation. It also would be susceptible to scaling conditions if a high water recovery level is to be used in an attempt to reduce the quantity of the rejected stream. Reverse osmosis processing would be more advantageous for small sized treatment systems since it would require lower energy requirements. However, it would still produce a non-permeate (reject) stream that would contain a concentrated level of dissolved solids. Thus, for this application, a reasonable alternative method of treatment is still needed that treats reject streams at low cost and with minimal operator attention.

Electrolytically-based processes appear to offer some advantages. These involve the passage of an electric current into the fluid via electrodes, which may be sacrificial in some configurations due to metal erosion by electrolysis action. Operating costs seem to be lower when compared to the use of chemical injection. U.S. Pat. No. 6,663,766 suggests and uses horizontally-placed electrode plates having misaligned flow passages in order to promote turbulence. Other attempts have been made to take advantage of the potential for using electrolytic processing of wastewater with some success (such as disclosed in in U.S. Pat. No. 5,531,865). Aluminum or iron electrodes are employed and the practice involves the introduction of direct current into the feed stream to energize the process. In such cases, the aluminum or iron goes into solution at the anode and gas (often hydrogen) may be released at the cathode. Trivalent metals used in the fabrication of anodes readily coagulate pollutants which can then be separated and removed by settling or filtration. Some of the problems encountered with this technique have been associated with electrode lifetimes as well as the need to employ relatively high electric current and attendant energy consumptive levels.

A modification used in the electrocoagulation process is one in which the gas generated by the electrolytic action in the water is used to capture the coagulated pollutants and float them to the water surface. This process is referred to as electroflocculation. This also does not require the use of chemicals, enabling such processing to achieve some of the desired operating goals. But, such use has often been configured as a batch-type process which causes concern when there is the need for unattended operation over long time periods in some applications, as well as possibly high replacement rate of electrodes, or the need to supply metal additives as the sacrificial material.

However, even this problem may be overcome by using variations in the electrolytic technique and equipment configuration. For example, U.S. Pat. No. 4,101,409 suggests the introduction of compressed air in order to assist in the flotation of suspended solids up to the water surface. This patent also reports that the simultaneous injection of air into the water could enhance the purification process. This seems to alleviate the need to employ large amounts of electrical energy to produce significant electrolytic off-gassing in promoting the agglomeration and flocculation process. Both organic and inorganic contaminants appear to be treatable in this manner, as well.

All references cited herein are incorporated herein by reference in their entireties.

BRIEF SUMMARY OF THE INVENTION

A method to purify water is provided, including the steps of providing a septic tank to hold and store unpurified water, the septic tank having an outlet to provide a water stream for processing and processing the water in an electrocoagulation and flocculation reactor that uses electrical energy to convert at least some of the dissolved solid material present in the water stream into suspended particulate form that can be subsequently filtered and separated out. The method continues with the steps of introducing air into the water stream to promote aerobic processing of contaminants in the water and to assist in agglomeration and flocculation of any suspended solid material present in the water, and filtering the water stream to separate suspended solid material from the stream and to adsorb some of its dissolved contaminants, and processing the water stream with a reverse osmosis processor, the reverse osmosis processor providing a reject stream that provides water back to the septic tank and a recycle stream that provides unpurified water back to the water stream exiting the septic tank.

The step of filtering may include providing multimedia and microfiltration filters. A step of processing the water stream through an ultraviolet radiation reactor to deactivate and destroy waterborne pathogens and to assist in oxidizing much of the dissolved solid material may be included. Electrodes for the electrocoagulation and flocculation reactor may be located in the septic tank.

The method may further include the step of providing a supply pump to supply water from the septic tank to a holding tank. Here, the step of introducing air into the water stream may occur upstream of the holding tank and may include the step of providing a water-air injector that creates a lower pressure zone that draws in and entrains ambient air into the water stream, wherein the entrained air is then separated from the water stream in the holding tank at a higher-than-ambient pressure and is mixed with the reject stream prior to entry of the reject stream back into the septic tank.

The electrocoagulation and flocculation reactor may be located in the septic tank.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
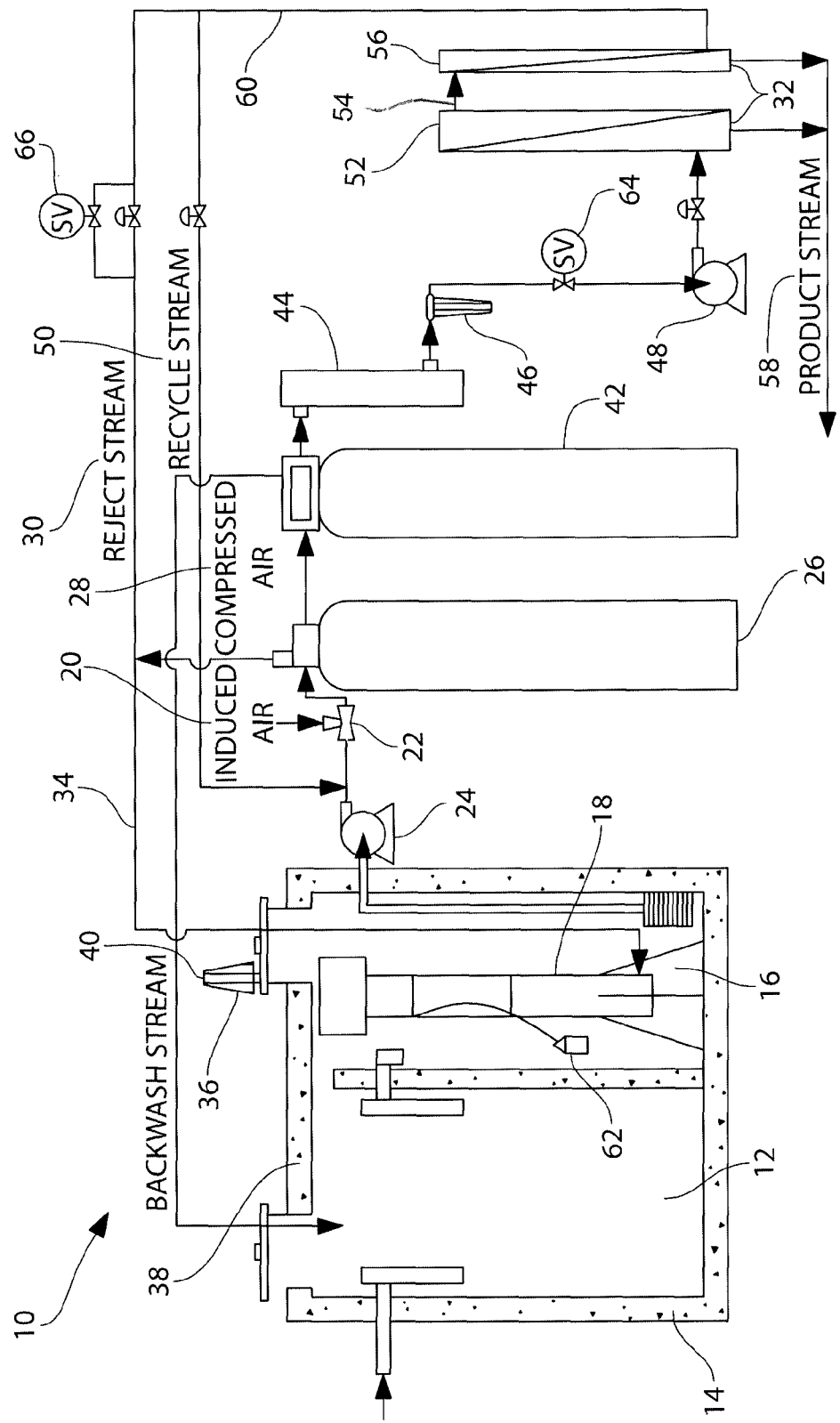
FIG. 1 is a simplified, schematic diagram of a method to purify water in accordance with an exemplary embodiment of the present invention.

This invention relates to the processing and purification of water and wastewater streams, for example, to eliminate the need for treatment and disposal in drainage fields. Its use also minimizes or entirely eliminates the quantity of residue liquids that remain after treatment. In particular, the present invention relates to a method and apparatus that incorporate the use of anaerobic and aerobic digestion, filtration, exposure to ultraviolet radiation, reverse osmosis processing, and/or precipitation by electrocoagulation and flocculation in a unique combination and configuration to serve as an integrated and complete treatment system which requires a modest supply of externally-supplied energy for its operation.

The present invention provides a method to purify residential septic waste, for example, in areas in which there are no local sewers and which have land characteristics that are not suitable for the use of drainage fields required for environmentally-acceptable, conventional on-lot septic treatment systems. The method and apparatus of the invention incorporate a unique integration of several treatment technologies. These include anaerobic and aerobic digestion, electrocoagulation and flocculation processing, ultraviolet disinfection, multimedia and micro-filtration, and reverse osmosis purification. A method of introducing air is also incorporated which employs some of the energy involved in pressurizing the liquid septic stream for use in the various processing steps. Introducing air helps to agglomerate suspended solids that have been formed during the electrocoagulation processing in order to assist in separation by filtration. The introduced air also supplies oxygen to support aerobic digestion of some of the other contaminants present in the septic waters. Also of importance is that use of the invention and its apparatus can be made to purify all of the liquid in the residential septic stream to an environmentally-acceptable degree, and to reliably perform this function with a minimum of maintenance attention, requiring only a frugal expenditure of electrical energy for its operation. Moreover, simple devices are employed in the apparatus that are easily manufactured or readily available commercially in order to assure a ready supply of operating elements for proper system maintainability over the long-term.

The present invention has several important possible benefits:

i) the elimination of the need for drainage fields for biological treatment and filtering of residential septic effluent discharges, ii) use for residences having plot plan areas smaller than that allowed by most local sewage regulatory and planning board authorities since such use reduces the need for the large land area required for drainage fields for septic treatment and disposal, iii) to be competitive in cost compared to conventional on-site sewage treatment systems, iv) the use of components and processing elements which can readily be replaced with essentially commercially available equipment or which are easily fabricated when needed, v) to produce treated effluent that conforms to purity levels established by the regulatory authorities that allows direct discharge on-site, into groundwater, or onto surface waters without the need for further treatment, and vi) to obtain a modest amount of driving energy using the conventional single phase electrical service entrance characteristic of that available to single residences in the United States, even in rural areas.

Generally, the method of the invention consists of: i) a septic tank that has air introduced into its contents in order to promote aerobic processing, ii) filtering facilities incorporating a combination of mixed media filtration and microfiltration in order remove suspended particulate matter that may be formed during the processing steps and which aid in inhibiting scaling and the formation of biological floc that otherwise can act as barriers to the flow stream, iii) an ultraviolet radiation disinfection reactor that destroys pathogens as well as assists in oxidizing total oxidizable carbons directly or by forming highly reactive hydroxyl ions that dissociate organic constituents into benign form, iv) a reverse osmosis processor that produces the purified water product, and v) an electrocoagulation and flocculating reactor that utilizes electric energy to process both the incoming septic stream and the residue stream discharged from the reverse osmosis processor, which is assisted by the introduction of ambient air into the liquid being electrically processed, so that dissolved solids are more readily converted into suspended form that can be separated by the filtration action.

Efforts made in this area indicate that by treating the reverse osmosis reject (or non-permeate) streams derived from reverse osmosis processing by electrocoagulation, the resultant liquid would have its dissolved solid content significantly reduced by conversion to the suspended state. Moreover, it was observed that the coincidental electrolytic formation of gaseous bubbles would aid in mingling and coagulating the released suspended solids with insoluble oils, such are found in cooking oil or some food wastes (that were injected into the processing liquid during test). This treatment gave good purification results using reasonably low reaction time intervals for low electrical power expenditure. Application of 6 to 20 fluctuating DC voltages across the process electrodes were made, resulting in the passage of 50 to 200 milliamperes of electric current through the water being treated. It produced dissolved solid concentrations remaining in the reject streams below drinking water standards (less than 250 milligrams as sodium chloride per liter). This indicated that by recycling the treated reject stream and then recycling it for further reverse osmosis treatment, all of the liquid within a septic stream could be sufficiently purified to allow subsequent direct discharge or recycling without causing environmental harm.

Furthermore, electrocoagulation and flocculation processing was simultaneously performed on both the septic stream directly entering the septic tank as discharged by the residence, and the reject stream returned from downstream reverse osmosis processing. It was still energized by a low voltage, fluctuating but rectified (DC) electric current. Also, it caused the electrolytic addition of coagulating metal ions from either sacrificial electrodes or from dissolved ionic metals already present within the septic liquid. (These ions were found to oxidize and coagulate with other pollutants in the water in a manner similar to that caused by the addition of coagulating chemicals such as alum and ferric chloride, but at a much more efficient rate). In addition, agglomeration was shown to be simultaneously enhanced by the electrolytic production of gas bubbles as well as the air that was purposely introduced into the liquid stream to be processed. In an exemplary embodiment of this invention, the process electrodes are located within the septic tank in order to reduce the dissolved solid content within the recycled reject stream, as well as to initialize the reduction of the dissolved solid content present in the incoming residential septic stream. This also allows the method to accommodate potential variations in dissolved solid content that may change from time-to-time in the incoming septic stream.

The ready availability and capacity of components that are used in the exemplary embodiment of this invention allow the treatment flows through the system to be increased up to eight-fold. Thus, the apparatus used in this invention for a single residence using the same processing equipment, could nominally process influent ranging from three-hundred and fifty gallons per day to two-thousand eight hundred gallons per day. The only changes required in using this single processing system for multiple housing would involve increasing the capacity of the septic tank (or adding multiple tanks) in order to provide an acceptable initial holdup time for the incoming septic streams.

The invention will be illustrated in more detail with reference to the following embodiments, but it should be understood that the present invention is not deemed to be limited thereto.

Process Flow:

Referring now to the drawings, wherein like part numbers refer to like elements throughout the several views, there is shown in FIG. 1 a method for purifying water 10 in accordance with an exemplary embodiment of the present invention. Septic discharge from, for example, a residence enters a first compartment 12 of a dual-chamber septic tank 14 by gravity flow wherein separation of suspended solids and grease and oil will take place. The capacity of the septic tank is such that it allows the influent septic stream to be held for a sufficient time to allow the process of anaerobic digestion to be initiated and continue for a period acceptable to the local or cognizant state regulatory authority. The fluid enters into a second compartment 16 of the septic tank 14 wherein its contaminants are subjected to aerobic digestion induced by the introduction of air, as well electrochemical oxidation due to the passing of a small electric current through the water using a pair of electrocoagulation and flocculation process electrodes 18 inserted into the liquid present in said septic tank compartment.

Ambient air 20 is induced by a water-air injector 22 that employs the energy provided by a supply pump 24 which lifts the liquid content from the second compartment of the septic tank and pressurizes it to a desired level for further processing. In doing so, it produces a liquid delivery pressure sufficient to convert its pressure energy into velocity energy which, in turn, creates a lower pressure zone that draws in and entrains ambient air to be mixed with the water stream. The water-air injector 22 then recompresses the mixed fluids by converting velocity energy back into pressure energy. Subsequently, the entrained air is separated from the liquid stream, but at a higher-than-ambient pressure level by discharging the air-liquid mixture into a holding tank 26. By the buoyancy difference between the entrained air and the liquid stream, the air stream 28 and is then separated from the liquid stream provided by pump 24 and is then mixed with the reject (or non-permeate) stream 30 that is transported back upstream from a reverse osmosis processor 32. The combined air and reject stream 34 is then introduced upstream into the electrocoagulation and flocculation process electrodes 18 located in the second compartment 16 of the septic tank 14.

As the waste water stream flows from the first compartment 12 of the septic tank 14 and into the second compartment 16, oxygen from the introduced air supply 28 supports aerobic reaction with its contaminants. In order to ventilate the septic tank 14 to prevent pressure buildup, an off-gas vent 36 is installed in the roof 38 of the septic tank 14 which allows the passive discharge of "used" air or gas bubbles after they have passed through the septic tank 14. A carbon or similar adsorbent-type filter 40 is also installed in this vent 36 in order to eliminate the potential release of undesirable odors.

When the pressurized liquid leaves the holding tank 26, it enters a multimedia filter tank 42 containing anthracite, quartz sand, garnet, and gravel and/or other suitable filtering and adsorbent material in order to separate out suspended solid material and also aid in the adsorption removal of much of the organic constituents remaining in the liquid stream. The multimedia filter tank 42 also contains a backwash control system that is timer-activated. When the multimedia filter tank 42 is in its backwash cycle, the water stream travels through a reverse path through the multimedia filter tank 42, and its discharge is directed back into the first compartment 12 of the septic tank 14.

The septic liquid from the multimedia filter tank 42 will then flow through an ultraviolet radiation (UV) reactor 44. There, ultraviolet radiation transfers electromagnetic energy from its suitable light source to the genetic material of any pathogen that may be present wherein it destroys its ability to reproduce, thus providing a disinfection method of treatment of the wastewater stream.

This treatment also helps to inhibit the tendency for biofilms to form which may otherwise interfere with the performance of a microfilter 46 and membranes contained in the reverse osmosis processor 32 located downstream.

As the disinfected liquid stream passes through the microfilter 46, colloidal foulant or other suspended material (both mineral and organic) that may have been formed by treatment within the upstream ultraviolet reactor 44, are removed. Microfiltration separates suspended solid material from the liquid stream using a microporous membrane, wherein the predominant removal mechanism is by straining or size exclusion; so the process achieves efficient exclusion of particles of a given size (or larger) regardless of influent pressure and concentration.

The filtered liquid is then sent to the reverse osmosis pressure pump 48 that produces a liquid pressure that is preset to a level consistent with the nature and dissolved contaminant concentration levels involved with the incoming residential septic stream, as well as with the expected increase in concentration level in the or reject streams 30 and recycle stream 50, after reverse osmosis processing. The liquid leaving the reverse osmosis pressure pump 48 is then sent to the reverse osmosis processor 32 which contains nano-filtration-type membranes of such construction and of such a natural static charge that would tend to repel foulant material that may still be formed or present in the liquid feed stream. Reverse osmosis processing is similar to microfiltration since they both employ porous membrane construction, but the reverse osmosis process involves the use of smaller pore membranes and purifies by a diffusive mechanism in which the separation efficiency is dependent on influent solute concentration, pressure and water flux rate. Pressure is used to provide a force gradient across the membrane, retaining the solute on one side and allowing the purified solvent to pass to the other side. A two-stage reverse osmosis unit is used in the exemplary embodiment of the invention in which the non-permeate (unpurified) stream 54 from the first stage membrane 52 is sent to the second stage membrane 56 in order to assist in achieving a high purification rate. The product water 58 that permeates through and is purified by the reverse osmosis membranes 52, 56 will be directly discharged into the environment or into a product water storage tank, or recycled for other uses as needed by the resident owner.

Water that does not pass through the reverse osmosis membranes 52, 56, i.e., the non-permeate stream 60, which retains the dissolved contaminants will be split into two streams: reject stream 30 and recycle stream 50. The first, the recycle stream 50, is transported back to the inlet of the water-air injector 22 where it is remixed with the liquid that is lifted from the second compartment 16 of the septic tank 15 and which was compressed by the supply pump 24. Thereafter, the mixture is recycled through the water-air injector 22, holding tank 26, multimedia filter 42, ultraviolet reactor 44, microfilter 46, and reverse osmosis pressure pump 48. This removes material that has precipitated or crystallized during the increase in concentration of contaminants as the product water 58 is removed by the reverse osmosis membranes 52, 56. Also, by retaining a high rated flow condition on the pressure side of the reverse osmosis membrane walls, the suspended solid material that may be formed at or adjacent to the membrane surfaces is removed by scouring action for separation from the liquid stream using the subsequent recycling and filtration actions.

The second portion of the split stream, i.e., the reject stream 30 that also does not pass through the reverse osmosis membranes 52, 56, is then transported to the electro-coagulation and flocculation reactor electrodes 18. On its way, it is mixed with the compressed air stream 28. An electric potential is applied to the incoming mixture in and around the reactor electrodes 18 which is in the form of a fluctuating direct current. It provides the electromagnetic impetus to transform the dissolved solid content within the liquid into a suspended form. The compressed air stream 28 when mixed with the reject stream 30 is an aid in helping to precipitate out and flocculate much of the suspended solids being created. It also provides an oxygen source to induce and maintain aerobic digestion of much of the contaminants present in the water contained within the second compartment 1 of the septic tank 14.

There are preferably also activation devices that provide appropriate process flow control during the startup or shutdown of the process. A water level control switch 62 is located in the second chamber 16 of the septic tank 14. It essentially is a float switch that functions as the sensing device for a process flow solenoid valve 64 that provides electric power to both the motor for the supply pump 24 and the motor for the reverse osmosis pressure pump 48, as well as their related controls. When the float switch indicates that the water level has been lowered to a preset low point, it will close the inlet solenoid valve 64 and allow power to be applied to the motors of both water pumps 24 and 48, essentially allowing the septic liquid to be lifted from the second compartment 16 of the septic tank 14 and proceed to the downstream processing facilities. When the float switch 62 reaches a preset high water level, it will open the process flow solenoid valve 64 and deactivate both motors for the water pumps, thus stopping the flow to the downstream processors.

A second solenoid valve, i.e., the backwash solenoid valve 66, is used in the system, as well. However, it is activated and opened only during startup. Essentially, when startup is initiated, the backwash solenoid valve 66 is opened and allows all of the non-permeate stream 60 from the reverse osmosis processor 32 to enter the reject stream line 30 and bypass the recycle stream line 50. In turn, this directs all of the non-permeate stream 60 that begins to flow at the reverse osmosis processor 32 to be transported directly to the electrocoagulation and flocculation electrodes 18 located in the second compartment 16 of the septic tank 14 for electric processing. This solenoid valve stays open for only a short period of time, preset for no more than sixty seconds. This valve opening it allows any solid buildup or floc formation that may have occurred next to the reverse osmosis membranes 52, 56 when the system was inactive, to be transported back to the septic tank 14 for subsequent electrocoagulation and flocculation processing, and eventual filtration. In effect, this provides a method of initially cleaning the pressure surfaces of the reverse osmosis membranes 52, 56 at startup.

Figure 2:
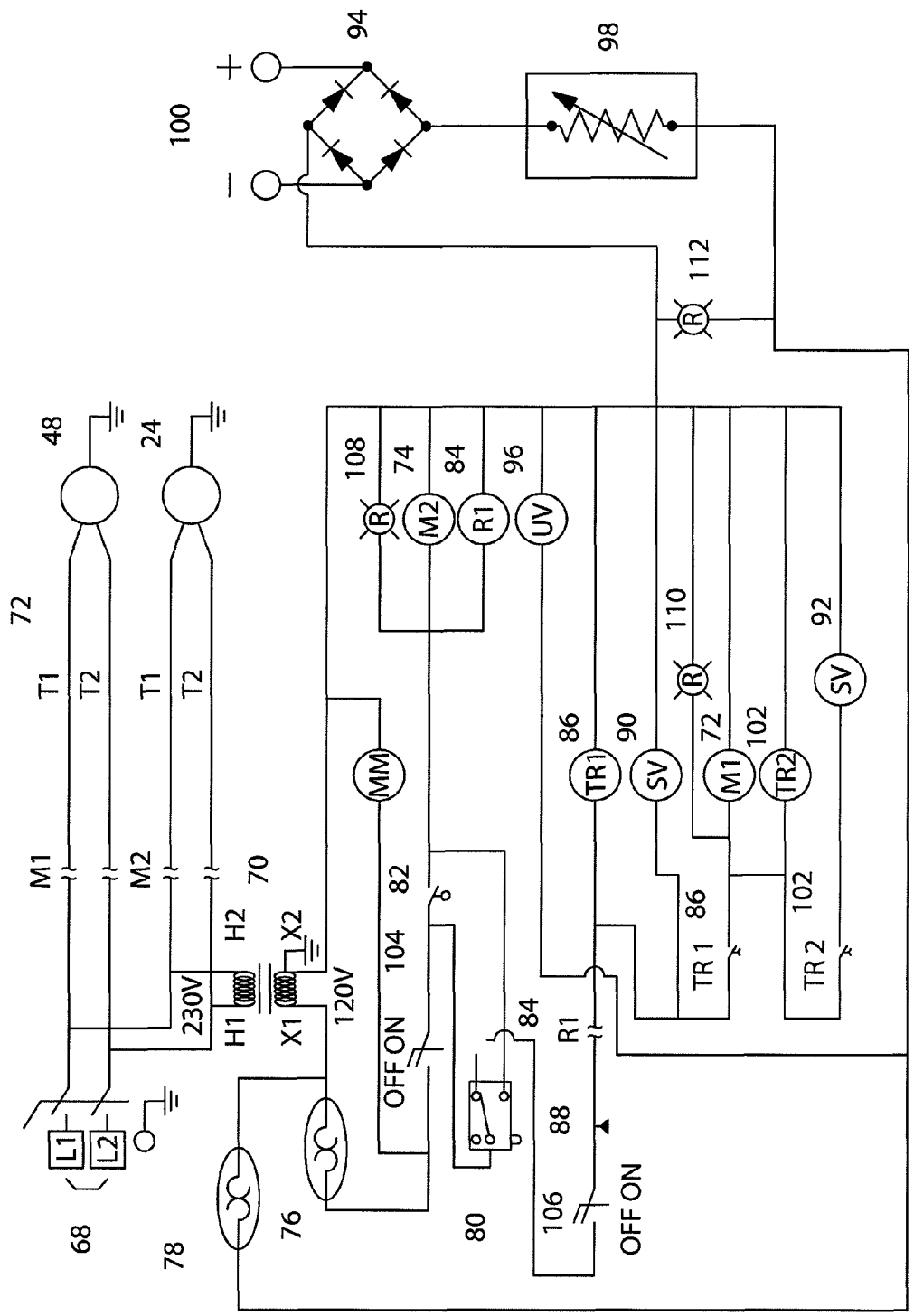
FIG. 2 is a simplified schematic diagram of the controls and electric distribution system of the method to purify water of FIG. 1.

Controls and Electric Distribution System:

Referring now to FIG. 2, a power disconnect switch 68 is a manual switch that feeds electric power to the processing system and its controls. The supply to the switch 68 may be made from a spare circuit breaker in a residential house electric panel, providing an alternating current, single phase power connection. The power disconnect switch 68 is located in the control box for the processing equipment and it allows maintenance to be performed on the system (that normally would be located outside the residence) without the need to enter the residence.

From this switch 68, the power is split three ways: two lines T1 and T2 each, provide the high voltage power (commonly, 230 to 240 volts) for the motors to the supply pump 24 and the reverse osmosis pressure pump 48; and two lines H1 and H2 connecting to a step-down transformer 70 that allows a lower voltage (commonly, 115 to 120 volts) to be distributed to the rest of the electrical controls.

The coil-current-activated contactors 72, 74 (or M1 and M2 controller also shown in FIG. 2), when energized, allow power to be sent to operate the supply pump motor 24 and the reverse osmosis pressure pump motor 48. M2 is the controller for the supply pump motor 24 and M1 is the controller for the reverse osmosis pressure pump motor 48. Closing the lower voltage circuit to each controller 72, 74 energizes the respective contactor coil 72, 74 that closes the higher voltage circuit to power its respective pump motor. For reliable and low maintenance operation, each contactor 72, 74 is fitted with air contacts which minimize or entirely quench electrical arcing when each contactor coil is de-energized, allowing the electromagnet core to return to its original position and reopen its contacts. Since alternating current is used to energize the contactor, a shading coil is also fitted in order to slightly delay the onset of magnetic flux in the core and thus prevent "buzzing" (a vibration that otherwise can occur at twice the line frequency). The control contactors 72, 74 are also fitted with thermal short-circuit protection that will interrupt power to its respective pump motor 24, 48 when an excessive temperature level is reached as may be caused by high current passage.

The control circuits are fitted with two overload circuit breakers 76, 78. Overload breaker 76 protects the control circuits to the pump motors (through coils 72 and 74), the multimedia filter controls 80, the water level control switch circuit 82 whose sensor is located in the second compartment 16 of the septic tank 14, the relay 84 (or R1 also noted in FIG. 2) which affects the power circuits to the reverse osmosis pump motor 48 and its related startup timer 86, and low delivery pressure control 88, as well as both the inlet supply solenoid valve 92 and the flush solenoid valve 92 (noted in FIG. 1 as 64 and 66, respectively).

In order to permit the supply pump 24 to operate separately from the reverse osmosis pump 48 to allow the pressure reaching the membranes 52, 56 of the reverse osmosis processor 32 to slowly build, use of the R1 relay 84 and the TR1 startup timer 86 is made. R1 relay 84 is activated once the power control contactor 74 for the supply pump motor 24 is activated. This, in turn, allows the TR1 timer 86 to be initiated. After a short preset time interval, TR1 times out and allows energization of the control circuit M1 or 72 to then send power to the reverse osmosis pump motor 48.

The second overload breaker 78 provides current protection for the rectifier circuit that converts the low voltage AC circuit into a fluctuating DC circuit using a pair of bridge diode circuits 94. It also protects the circuits to the ultraviolet disinfection lamp and its own internal control circuits 96. Locating this breaker in its separate circuit is associated with its primary purpose: to open the circuit in the event that the liquid being processed around the electrodes of the electrocoagulation and flocculation reactor 18 exhibits high electrical conductivity; in other words: low electrical resistance. A condition of high conductivity would be caused by the presence of high levels of dissolved ionic constituents that could cause a relatively high electrical current to pass through the water and overload the circuit. Since the diode bridge circuits offer small electrical resistance to the one-way passage of current, a variable resistor 98 is inserted in series connection to the diodes and electrodes. This resistor 98 is preset to provide a resistance sufficiently high to cope with the highest conductivity (or lowest resistance) expected to be exhibited in the reject stream that will eventually be processed in the system.

The multimedia filter interlock switch and its internal control 80 are used to reverse the liquid flow through the multimedia filter tank 42 and transport the backwash liquid upstream to the first compartment of the septic tank 14. At the same time, it disables power to the reverse osmosis pump motor 48. This is used to periodically backwash the filter using the pressure available from the supply pump 24. Backwash action is normally conducted once every twenty-four hours, preferably at night when there is little or no septic flow from the residence. It is to be noted that power is continually fed to the ultraviolet disinfection (internal control) circuits 96 and to the electrocoagulation and flocculation circuits 94, 98, 100. Even though the liquid stream is quiescent in the disinfection unit during the time of backwash action, UV radiation exposure is continued in order to suppress potential renewal of biological or pathogen activity. As long as the manual power disconnect switch 68 is activated and as long as overload breaker 78 remains closed, power will always be transmitted to both the ultraviolet disinfection unit 44 and the electrocoagulation and flocculation reactor 18.

Timer TR2 and its control 102 allow the initial onrush of liquid through the reverse osmosis membranes 52, 56 to be directed back to the septic tank 14, by closing the flush solenoid valve 92. As noted earlier, this flush operation is started when the reverse osmosis pump motor 48 initially energized and continues for up to sixty seconds based on the preset setting of timer TR2. As also indicated earlier, its function is to scour and remove any bio-floc or other scaling material that may have been formed at the reverse osmosis membrane surfaces while the reverse osmosis pump was inactive.

There are two manual switches used for maintenance purposes while power remains energized to the remainder of the system. These are: the supply pump switch 104 and the reverse osmosis pump switch 106. The system also includes three indicator lamps, also used for maintenance and for checkout purposes. These are the supply pump ON lamp 108, the reverse osmosis pump ON lamp 110, and the electrocoagulation and flocculation reactor ON lamp 112.

Figure 3:
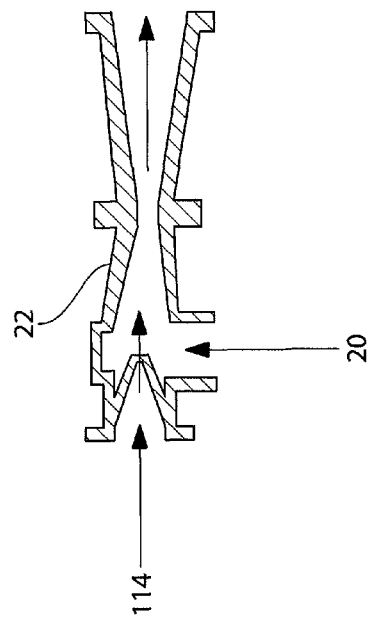
FIG. 3 is a simplified cross-sectional view of a water-air injector used in the method to purify water of FIG. 1.

Method of Inducing Ambient Air into the Septic Liquid Stream:

As can be seen in FIG. 3, the water-air injector 22 that is employed is essentially a pump or air compressor having no moving parts. It uses the Venturi effect provided by a convergent-divergent nozzle to change the pressure energy in the water stream 114 provided by the supply pump 24, to velocity energy. In turn, this velocity energy produces a lowered pressure zone using a configuration that induces ambient air 20 to be drawn into the injector to mix with the incoming water stream 114. As the mixture then passes into and through the divergent section of the injector 22, it recompresses the mixed fluids (air and water) 116 by changing its velocity energy back into pressure energy.

The resultant mixture 116 then passes into the holding tank 26 where, by buoyancy difference between the water and the then compressed air, separation is allowed to occur in the interior of the tank 26. The liquid is forced upward through a central standpipe 118 in the holding tank 26 by the continuing inrush of mixed fluids into the tank, at the top of which it discharges 124 and passes on to the multimedia filter tank 42 and the remaining downstream processing equipment.

The discharging compressed air 28 having its pressure in the interior of the holding tank 118 maintained to the required level by a control orifice 120, is then mixed with the reject stream 30 from the reverse osmosis processor 32 and inserted into the reaction zone between the electrodes of the electrocoagulation and flocculation reactor 18 located in the second compartment 16 of the septic tank 14.

Figure 4:
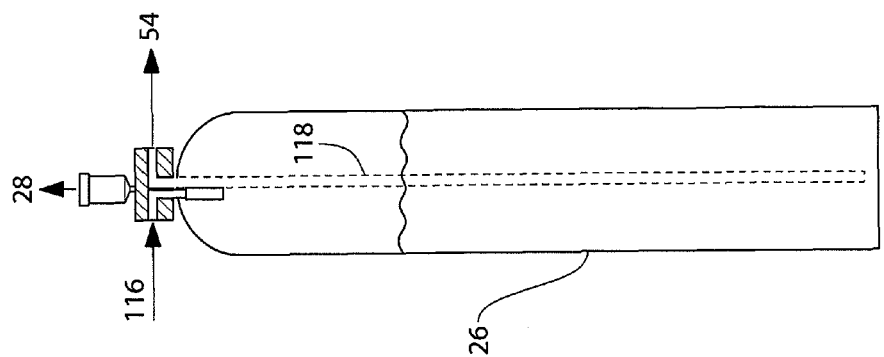
FIG. 4 is a simplified view of a drawing of a holding tank used the method to purify water of FIG. 1.

Electrode Configuration:

As can be seen in FIG. 4, the electrocoagulation and flocculation electrodes 18 are constructed with a hollow stainless steel cathode 126 (for example, a cylinder three inches in diameter) and a coaxial, solid aluminum anode 128 (for example, a rod three-quarter inch in diameter), assembled into a single unit but electrically insulated from each other. The cylindrical assembly is supported by three adjustable stainless steel legs 130 in order to rest on the septic tank 14 floor, but also to maintain the elevation of its electric control box 132 above the highest expected water level.

The mixed reject stream and compressed air 58 enter a fixture 136 on the side and near the open base of the hollow cathode cylinder. This fixture is positioned at such an angle that the entering flow (entering at a higher-than-ambient pressure level) is made to swirl upward through the interior of the cathode cylinder in a corkscrew-type motion. This helps to promote penetration within the entire volume contained in the interior of the cathode cylinder and allows the electrical current introduced by the electrodes to rapidly react with the incoming fluid mixture.

The stainless steel cathode cylinder 126 also contains several two inch diameter holes 138 along its length in order to provide access and mixing of the septic water contained within the second compartment 16 of the septic tank 14 with the processed reject stream 30. During periods when the water level control 62 (FIG. 1) senses a high water level condition in the septic tank 14, the electrocoagulation and flocculation electrodes 18 remain energized and continue to affect the water contained within the septic tank compartment 16, while the rest of the processing system controls would be deactivated. The electrolytically-produced gas bubbles which continue to be generated, aid in inducing recirculation and mixing of the water in the septic tank so that uniform treatment of all the water is encouraged during this time.

While the invention has been described in detail and with reference to specific examples thereof, it will be apparent to one skilled in the art that various changes and modifications can be made therein without departing from the spirit and scope thereof.

What is claimed is:

1. A method to purify water, comprising:
    (a) holding and storing unpurified water in a septic tank having an outlet to provide a water stream for processing;
    (b) processing the water stream in an electrocoagulation and flocculation reactor that uses electrical energy to convert at least some of the dissolved solid material present in the water stream into suspended particulate form that can be subsequently filtered and separated out;
    (c) introducing air into the water stream to promote aerobic processing of contaminants in the water and to assist in agglomeration and flocculation of any suspended solid material present in the water;
    (d) filtering the water stream to separate suspended solid material from the stream and to adsorb some of its dissolved contaminants;
    (e) processing the water stream with a reverse osmosis processor, the reverse osmosis processor providing a reject stream that provides water back to the septic tank and a recycle stream that provides unpurified water back to the water stream exiting the septic tank;
    (f) determining a resistance to manage a highest conductivity and lowest resistance of the reject stream; and
    (g) applying a voltage to set an electric current applied to the reject stream in the electrocoagulation and flocculation reactor to lower a concentration of dissolved solid materials having entered the septic tank.

2. The method of claim 1, wherein the step of filtering includes filtering through multimedia and microfiltration filters.

3. The method of claim 1, including the step of processing the water stream through an ultraviolet radiation reactor to deactivate and destroy waterborne pathogens and to assist in oxidizing much of the dissolved solid material.

4. The method of claim 1, wherein the step of processing the water stream in the electrocoagulation and flocculation reactor includes locating the reactor in the septic tank.

5. The method of claim 1, including the step of pumping supply water from the septic tank to a holding tank, wherein the step of introducing air into the water stream occurs upstream of the holding tank and includes the step of drawing in and entraining ambient air into the water stream by drawing in and entraining ambient air into the water stream using a water-air injector that creates a lower pressure zone, wherein the entrained air is then separated from the water stream in the holding tank at a higher-than-ambient pressure and is mixed with the reject stream prior to entry of the reject stream back into the septic tank.

\* \* \* \* \*